(12) United States Patent
Joo et al.

(10) Patent No.: US 12,506,017 B2
(45) Date of Patent: Dec. 23, 2025

(54) SYSTEM AND METHOD FOR CONFIRMING MOUNTED STATE OF PICKER MOUNTS

(71) Applicant: INTEKPLUS CO., LTD., Daejeon (KR)

(72) Inventors: Byeong Gwon Joo, Daejeon (KR); Young Bo Kwak, Daejeon (KR); Mok Sung Kim, Daejeon (KR); Jae Hun Nam, Sejong-si (KR)

(73) Assignee: INTEKPLUS CO., LTD., Daejeon (KR)

( * ) Notice: Subject to any disclaimer, the term of this patent is extended or adjusted under 35 U.S.C. 154(b) by 635 days.

(21) Appl. No.: 17/914,970

(22) PCT Filed: Jan. 15, 2021

(86) PCT No.: PCT/KR2021/000596
§ 371 (c)(1),
(2) Date: Sep. 27, 2022

(87) PCT Pub. No.: WO2021/201393
PCT Pub. Date: Oct. 7, 2021

(65) Prior Publication Data
US 2023/0144924 A1 May 11, 2023

(30) Foreign Application Priority Data
Apr. 1, 2020 (KR) .................. 10-2020-0039747

(51) Int. Cl.
*H01L 21/52* (2006.01)
*G06K 19/06* (2006.01)
*H01L 21/683* (2006.01)

(52) U.S. Cl.
CPC ........ *H01L 21/52* (2013.01); *G06K 19/06037* (2013.01); *H01L 21/683* (2013.01)

(58) Field of Classification Search
CPC ..... H01L 21/52; H01L 21/683; H01L 23/544; H01L 21/67; H01L 21/6836; H01L 2223/54413; G06K 19/06027
See application file for complete search history.

(56) References Cited

U.S. PATENT DOCUMENTS

| | | | |
|---|---|---|---|
| 7,290,701 B2 | 11/2007 | Kou | |
| 7,451,008 B2* | 11/2008 | Kobayashi | ......... H05K 13/0895 700/121 |

(Continued)

FOREIGN PATENT DOCUMENTS

| | | |
|---|---|---|
| CN | 1767759 A | 5/2006 |
| CN | 102891098 A | 1/2013 |

(Continued)

OTHER PUBLICATIONS

Chinese Office Action issued on Mar. 8, 2025, in corresponding Chinese Patent Application No. 202180026460.X. (7pages in Chinese).

(Continued)

*Primary Examiner* — Patrick H Mackey
(74) *Attorney, Agent, or Firm* — NSIP Law (57) ABSTRACT

The present invention relates to a system and a method for confirming the mounted state of picker mounts. Barcodes are formed on corresponding picker mounts while including information for identifying each type of picker mount. A barcode reader is arranged on one side of a variable picker module so as to sequentially read each barcode of the picker mounts moving in the arrangement direction of pickers while mounted on the pickers. A system controller identifies each position and type of the corresponding picker mounts on the basis of information provided from the barcode (Continued)

reader, and then, compares same with confirmation criteria so as to confirm incorrect mounting and non-mounting of the picker mounts.

3 Claims, 8 Drawing Sheets

(56) References Cited

U.S. PATENT DOCUMENTS

| | | | | |
|---|---|---|---|---|
| 8,881,385 | B2* | 11/2014 | Endo | H05K 13/0409 |
| | | | | 29/840 |
| 9,488,449 | B2* | 11/2016 | Opperman | B25J 11/0025 |
| 10,813,260 | B2* | 10/2020 | Kamio | H05K 13/087 |
| 10,820,458 | B2* | 10/2020 | Nishiyama | G06T 7/74 |
| 2021/0016454 | A1* | 1/2021 | Jeong | B25J 15/0616 |

FOREIGN PATENT DOCUMENTS

| | | | | |
|---|---|---|---|---|
| CN | 102891098 | B | | 12/2016 |
| CN | 208932493 | U | | 6/2019 |
| JP | 2005-138260 | A | | 6/2005 |
| JP | 2005244175 | A | * | 9/2005 ........... G05B 19/042 |
| JP | 2006-108138 | A | | 4/2006 |
| JP | 2010-41001 | A | | 2/2010 |
| JP | 4482598 | B2 | | 6/2010 |
| JP | 2013-26501 | A | | 2/2013 |
| JP | 5920864 | B2 | | 5/2016 |
| JP | 6101361 | B2 | | 3/2017 |
| KR | 10-0737400 | B1 | | 7/2007 |
| KR | 10-2010-0039956 | A | | 4/2010 |
| KR | 10-2010-0054437 | A | | 5/2010 |
| KR | 10-2015-0137322 | A | | 12/2015 |
| KR | 10-1665393 | B1 | | 10/2016 |
| KR | 10-1667488 | B1 | | 10/2016 |
| KR | 10-1667686 | B1 | | 10/2016 |
| KR | 10-2018-0059658 | A | | 6/2018 |
| TW | 201306158 | A1 | | 2/2013 |
| TW | 1557832 | B | | 11/2016 |
| WO | WO 2010/016570 | A1 | | 2/2010 |
| WO | WO 2015/059749 | A1 | | 4/2015 |

OTHER PUBLICATIONS

Korean Office Action issued on Jul. 5, 2021 in corresponding Korean Patent Application No. 10-2020-0039747 (2 pages in Korean).
International Written Opinion issued on Apr. 23, 2021 in counterpart Patent Application No. PCT/KR2021/000596 (3 pages in Korean).
Chinese Office Action issued on Aug. 24, 2024, in counterpart Chines Patent Application No. 202180026460.X (7 pages in English, 7 pages in Chinese).
Chinese Notice of Allowance issued on May 16, 2025, in corresponding Chinese Patent Application No. 202180026460.X. (3pages in Chinese).

* cited by examiner

SYSTEM AND METHOD FOR CONFIRMING MOUNTED STATE OF PICKER MOUNTS

CROSS REFERENCE TO RELATED APPLICATIONS

This application is a U.S. National Stage Application of International Application No. PCT/KR2021/000596, filed on Jan. 15, 2021, which claims the benefit under 35 USC 119(a) and 365(b) of Korean Patent Application No. 10-2020-0039747, filed on Apr. 1, 2020, in the Korean Intellectual Property Office, the entire disclosure of which is incorporated herein by reference for all purposes.

TECHNICAL FIELD

The present invention relates to technology for confirming a mounted state of picker mounts provided for each type according to sizes of types of transfer target objects such as semiconductor elements and mounted on pickers of a variable picker module.

BACKGROUND ART

In general, after semiconductor elements are manufactured through a semiconductor process, the semiconductor elements are tested before shipment. That is, when there are an internal defect of a semiconductor element wrapped with a package as well as an external defect thereof, the performance thereof is fatally affected. Accordingly, various tests including external defect inspections as well as electrical operation tests are performed on semiconductor elements.

After semiconductor elements are accommodated in a test tray and tested using test equipment, the semiconductor elements may be classified into good products and defective products according to a test result and transferred to an unloading tray and a reject tray. In this case, pickers of a picker module pick up the semiconductor elements from the test tray and put down the semiconductor elements to the unloading tray and the reject tray according to good products and defective products.

The picker module may be configured to supply negative pressure to the pickers to adsorb the semiconductor elements and to supply positive pressure to the pickers to desorb the semiconductor elements. Picker mounts may be mounted on pneumatic actuating ends of the pickers in a state of being arranged in a line. Accordingly, the picker mounts may be mounted on the pickers in a line to adsorb or desorb the semiconductor elements.

Meanwhile, sizes of the semiconductor elements may vary for each type, and accordingly, the tray may be configured to accommodate the semiconductor elements having various sizes according to a Joint Electron Device Engineering Council (JEDEC) standard. In the tray, since an interval between tray pockets for accommodating semiconductor elements is changed according to the sizes of the semiconductor elements, a picker module may also be formed in a variable type in which an interval between the pickers is adjusted according to the interval between the tray pockets. In addition, the picker mounts may be provided for each type and replaced according to sizes of types of the semiconductor elements.

However, in a case in which the picker mount is erroneously mounted because the picker mount cannot be replaced on the picker according to a change in type of a semiconductor element, when the semiconductor element is transferred, the semiconductor element may be damaged due to the use of an inappropriate picker mount.

In particular, in a state in which a picker mount used for transferring the relatively large semiconductor element is not replaced in time even though a semiconductor element is changed from a relatively large type to a relatively small type, when an interval between the pickers is adjusted to be narrow, the picker mount may interfere with picker mounts positioned in the vicinity to damage the picker. In addition, when the picker mount is not mounted, an error in transferring the semiconductor element between trays may occur.

DISCLOSURE

Technical Problem

The present invention is directed to providing a system and a method for confirming a mounted state of picker mounts in which, before an operation of transferring a transfer target object, whether picker mounts are properly installed on pickers is identified in advance, thereby preventing damage to the transfer target object, damage to the picker, or a transfer error.

Technical Solution

According to an embodiment of the present invention, a system for confirming a mounted state of picker mounts is a system for identifying a mounted state of picker mounts provided for each type according to sizes of types of transfer target objects and mounted on pickers of a variable picker module, the system including barcodes, a barcode reader, and a system controller.

The barcodes may include information for identifying types of the picker mounts and may be formed on the picker mounts. The barcode reader may be disposed at one side of the variable picker module to sequentially read the barcodes of the picker mounts moving in an arrangement direction of the pickers in a state of being mounted on the pickers. The system controller may identify positions and types of the picker mounts based on information provided from the barcode reader and then compare the identified positions and types with a validation criteria to identify whether the picker mounts are erroneously mounted or are not mounted According to another embodiment of the present invention, a method of confirming a mounted state of picker mounts is a method of identifying a mounted state of picker mounts provided for each type according to sizes of types of transfer target objects and mounted on pickers of a variable picker module. First, barcodes, which include information for identifying types of the picker mounts, are formed and provided on the picker mounts. Next, while the picker mounts mounted on the pickers are moved in an arrangement direction of the pickers, the barcodes of the picker mounts are sequentially read by a barcode reader. Then, a system controller identifies positions and types of the picker mounts based on information provided from the barcode reader and then compares the identified positions and types with a validation criteria to identify whether the picker mounts are erroneously mounted or are not mounted.

Advantageous Effects

According to the present invention, before an operation in which a variable picker module transfers a transfer target object, whether picker mounts are properly installed on pickers can be identified in advance to operate the variable picker module for a transfer operation, thereby preventing damage to the transfer target object, damage to the picker, or a transfer error.

MODES OF THE INVENTION

The present invention will be described in detail with reference to the accompanying drawings as follows. The same elements are assigned the same reference numerals. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, and the like of elements in the drawings may be exaggerated to make the description clear.

Figure 1:
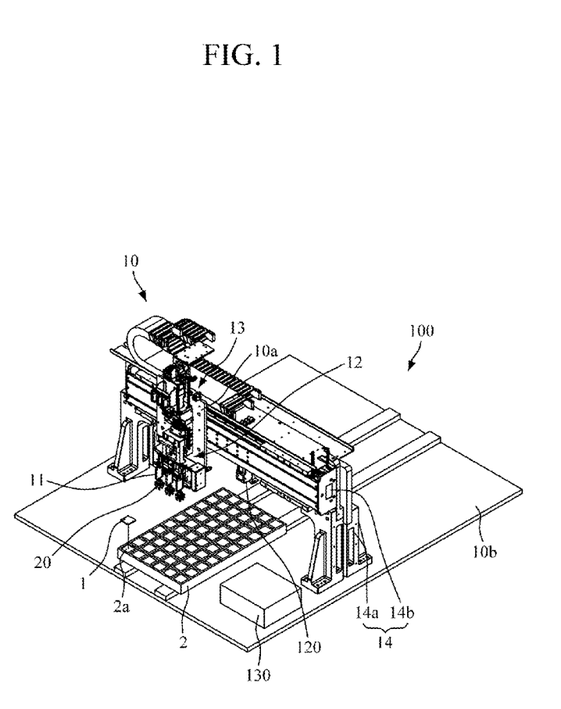
FIG. 1 is a perspective view of a system for confirming a mounted state of picker mounts according to one embodiment of the present invention.
Figure 2:
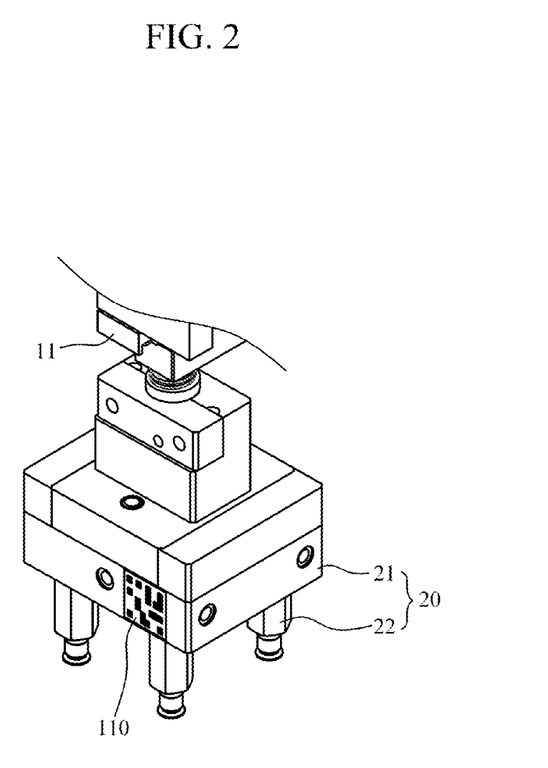
FIG. 2 is a perspective view illustrating a picker mount taken from FIG. 1.
Figure 3:
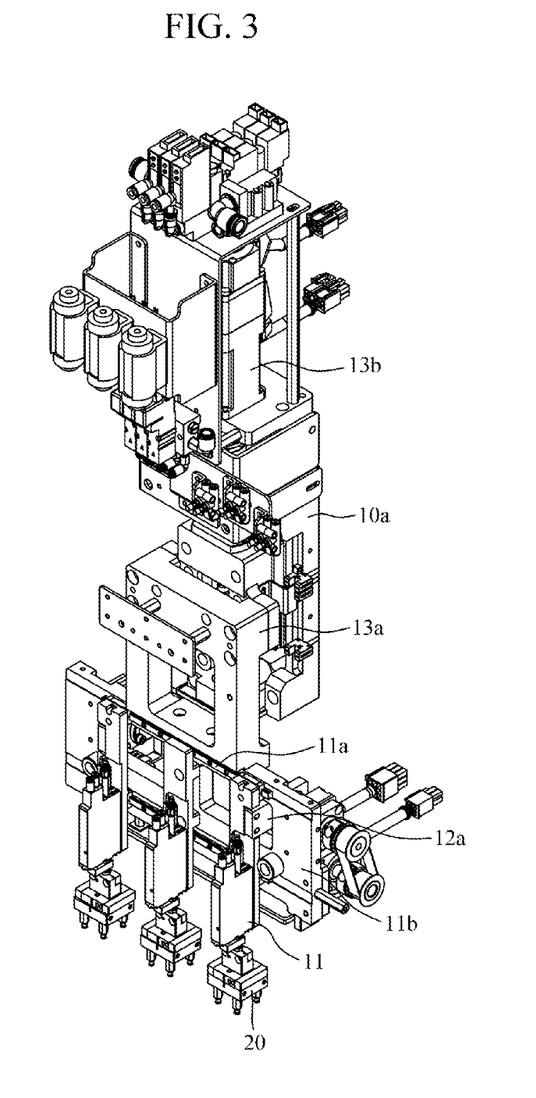
FIG. 3 is a perspective view illustrating the front of a picker module in FIG. 1.
Figure 4:
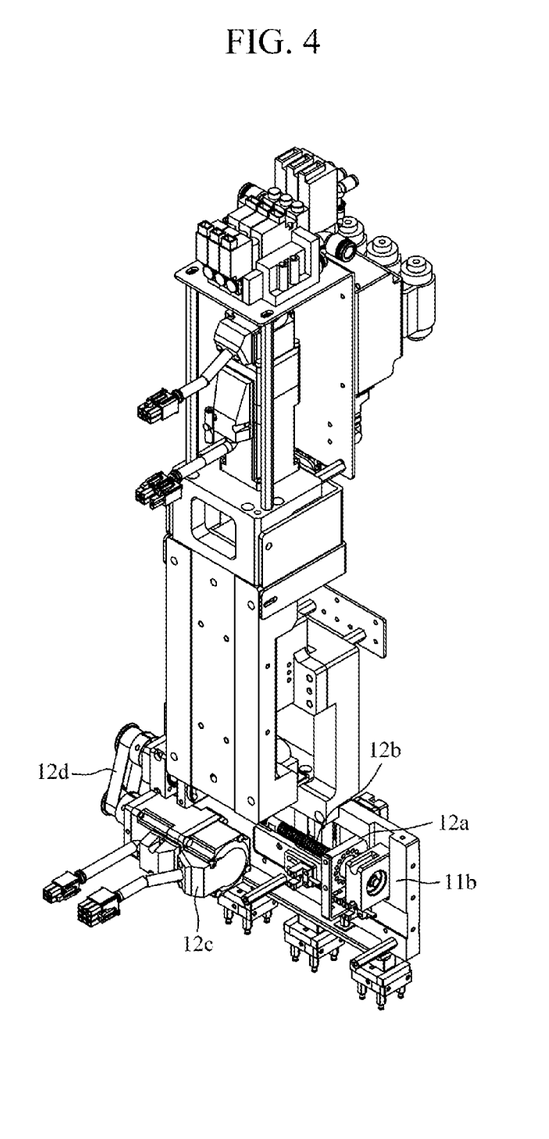
FIG. 4 is a perspective view illustrating the rear of the picker module in FIG. 1.
Figure 5:
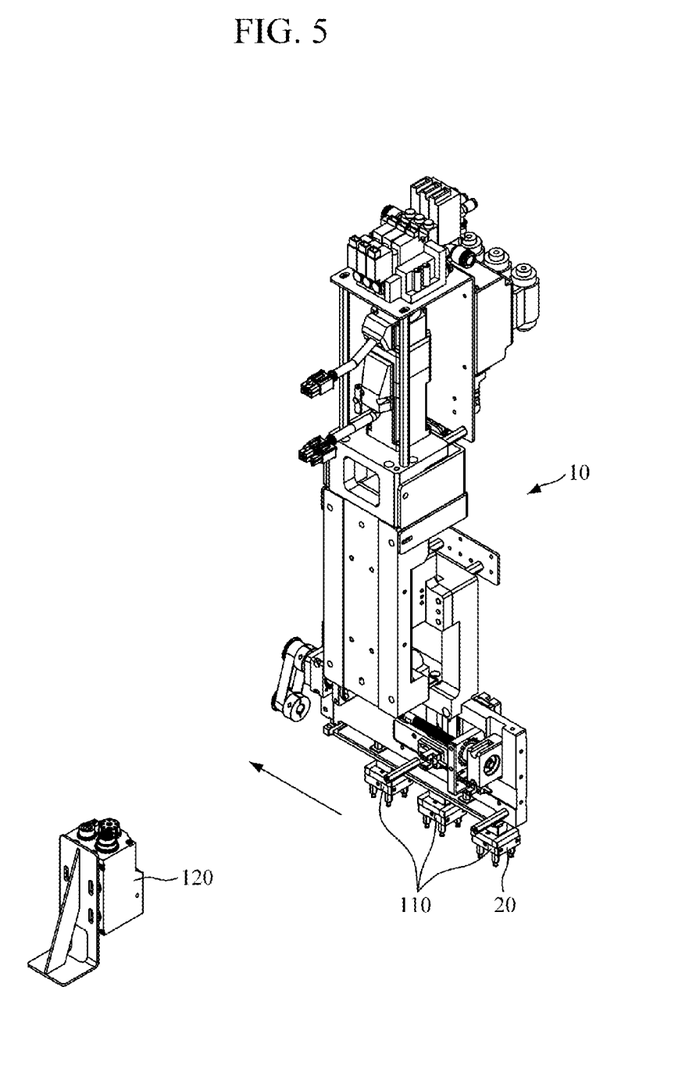
FIG. 5 is a view for describing a process of confirming a mounted state of the picker mount in a process of moving the picker module.

FIG. 1 is a view of a configuration of a system for confirming a mounted state of picker mounts according to one embodiment of the present invention. FIG. 2 is a perspective view illustrating a picker mount taken from FIG. 1. FIG. 3 is a perspective view illustrating the front of a picker module in FIG. 1. FIG. 4 is a perspective view illustrating the rear of the picker module in FIG. 1. FIG. 5 is a view for describing a process of confirming a mounted state of the picker mount in a process of moving the picker module.

Referring to FIGS. 1 to 5, a system 100 for confirming a mounted state of picker mounts according to one embodiment of the present invention is for identifying a mounted state of picker mounts 20 provided for each type according to sizes of types of transfer target objects 1 and mounted on pickers 11 of a variable picker module 10. The system 100 includes barcodes 110, a barcode reader 120, and a system controller 130.

Here, the transfer target objects 1 may correspond to semiconductor elements or the like that are tested while accommodated in tray pockets 2*a* of a tray 2. The variable picker module 10 may include the pickers 11, an interval adjustment mechanism 12, a lift mechanism 13, and a horizontal movement mechanism 14.

The pickers 11 are arranged in a line. Each picker 11 may receive negative pressure from a pneumatic supply to adsorb the transfer target object 1 and may receive positive pressure from the pneumatic supply to desorb the transfer target object 1.

When an interval between the tray pockets 2*a* is changed according to a size of each type of the transfer target object 1, the interval adjustment mechanism 12 adjusts an interval between the pickers 11 according to the interval between the tray pockets 2*a*. The interval adjustment mechanism 12 includes horizontal moving bodies 12*a*, a horizontal screw 12*b*, and a rotation motor 12*c*.

The horizontal moving bodies 12*a* are fixed to the pickers 11 moving to adjust an interval among the pickers 11. When an odd number of pickers 11 are provided, the horizontal moving body 12*a* may be provided to be fixed to other pickers 11 except for one picker 11 in the middle. When an even number of pickers 11 are provided, the horizontal moving body 12*a* may be provided to be fixed to all of the pickers 11. The pickers 11 may be supported on a picker support 11*b* by a linear guide 11*a* to be horizontally movable.

The horizontal screw 12*b* is horizontally disposed to extend in an arrangement direction of the pickers 11 to be rotatably supported on the picker support 11*b*. The horizontal screw 12*b* is screw-coupled to each of the horizontal moving bodies 12*a* fixed to the pickers 11. The horizontal screw 12*b* may move the horizontal moving bodies 12*a* toward or away from each other at the same pitch in a rotation direction to widen or narrow the interval between the pickers 11.

The rotation motor 12*c* provides a forward or reverse rotational force to the horizontal screw 12*b*. The forward or reverse rotational force of the rotation motor 12*c* may be transmitted to the horizontal screw 12*b* by a power transmitter 12*d*. The power transmitter 12*d* may include a driving pulley coaxially fixed to a driving shaft of the rotation motor 12*c*, a driven pulley coaxially fixed to the horizontal screw 12*b*, and a belt disposed over the driving pulley and the driven pulley to transmit the rotation of the driving pulley to the driven pulley.

The interval adjustment mechanism 12 and the power transmitter 12*d* may have various known configurations. A position of any one of the horizontal moving bodies 12*a* may be detected by a position sensor, and the rotation motor 12*c* may controlled and be driven to adjust the pickers 11 at a set interval according to information provided from the position sensor.

The lift mechanism 13 elevates the picker support 11*b* with respect to a module base 10*a* to elevate the pickers 11, thereby picking up or putting down the transfer target objects 1. The lift mechanism 13 may include a lift block 13*a* and a lift actuator 13*b*.

The lift block 13*a* is supported on the module base 10*a* by the linear guide to elevate in a state of being fixed to the picker support 11*b*. The lift actuator 13*b* elevates the lift block 13*a* with respect to the module base 10*a*. The lift actuator 13*b* may include a vertical screw and a rotation motor.

The vertical screw is disposed to vertically extend and rotatably supported on the module base 10*a*. The vertical screw is screw-coupled to the lift block 13*a*. The vertical screw may elevate the pickers 11 by elevating the lift block 13*a* in a rotation direction. The rotation motor provides a forward or reverse rotational force to the vertical screw. The lift actuator 13*b* may be provided as various known actuators such as a linear motor.

The horizontal movement mechanism 14 allows the pickers 11 to horizontally reciprocate by allowing the module base 10a to horizontally reciprocate. The horizontal movement mechanism 14 includes a column 14a and a linear actuator 14b. In a state of being fixed to an equipment base 10b of test equipment or the like, the column 14a supports the module base 10a to be slidably moved in a horizontal direction by a linear guide.

The linear actuator 14b allows the module base 10a to horizontally reciprocate. The linear actuator 14b may include a screw and a rotation motor or may be provided as various known actuators such as a linear motor.

An upper portion of the picker mount 20 is detachably mounted on a pneumatic actuating end of the picker 11 so that the picker mount 20 is replaceable. The picker mount 20 may be coupled to the pneumatic actuating end of the picker 11 through a screw coupling method or the like. The picker mount 20 includes a plurality of nozzles 22 at a lower portion thereof.

The picker mount 20 transmits negative or positive pressure supplied to the picker 11 to the nozzles 22 through a flow path in a mount body 21 via an upper portion of the mount body 21. Accordingly, the picker mount 20 may adsorb the transfer target object 1 using the negative pressure acting on the nozzles 22 and may detach the transfer target object 1 using the positive pressure acting on the nozzles 22. Except for the upper portion of the picker mount 20, sizes of the remaining portions thereof may be set according to sizes of types of the transfer target objects 1 which are to be transferred between the trays 1, and thus the picker mount 20 may be provided for each type.

The barcodes 110 include information for identifying types of the picker mounts 20 and are formed on the corresponding picker mounts 20. That is, the barcode 110 may be read by the barcode reader 120 so that the type of the corresponding picker mount 20 can be identified. The barcode 110 may be a two-dimensional barcode. The two-dimensional barcode is a barcode in the form of a two-dimensional matrix and is also used as a name of a quick response (QR) code.

The barcode 110 may be engraved and formed in the assigned picker mount 20 with a laser. The barcodes 110 may be formed on side surfaces exposed in the same direction in a state in which the picker mounts 20 are mounted on the pickers 11. Accordingly, the barcodes 110 may be read by the barcode reader 120 in a process in which the corresponding picker mounts 20 move in the arrangement direction of the pickers 11 in a state of being mounted on the pickers 11.

The barcode reader 120 is disposed around the variable picker module 10 to sequentially read the barcodes 110 of the picker mounts 20 moving in the arrangement direction of the pickers 11 in a state of being mounted on the pickers 11. The barcode reader 120 may be positioned and fixed to the equipment base 10b to sequentially read the barcodes 110 of the picker mounts 20 that move relative to each other.

The barcode reader 120 may be configured to read a form of the barcode 110 with an optical barcode sensor and provide a read result to the system controller 130 as digital data. When the barcode 110 is the two-dimensional barcode, the barcode reader 120 is configured to read the two-dimensional barcode.

The system controller 130 identifies positions and types of the corresponding picker mounts 20 based on information provided from the barcode reader 120 and then compares the identified positions and types with a validation criteria to identify whether the picker mounts 20 are erroneously mounted or are not mounted. Here, the validation criteria criterion is data for setting a criterion for a type of the picker mount 20 to be mounted on the pickers 11 according to a type of the transfer target object 1.

In a state in which the system controller 130 receives data about an initial position of the pickers 11 with respect to the barcode reader 120 in advance, the system controller 130 may identify positions and types of the picker mounts 20 according to moving positions of the pickers 11 based on information provided from the barcode reader 120. The system controller 130 may identify a type of the corresponding picker mount 20 and whether the corresponding picker mount 20 is mounted for each picker 11 and may store identified information as data.

The system controller 130 may compare identified position and type data of the picker mounts 20 with validation reference data that is input in advance, thereby identifying whether the picker mounts 20 are erroneously mounted or are not mounted for each picker 11. When the system controller 130 identifies that the picker mounts 20 are erroneously mounted or not mounted before an operation in which the variable picker module 10 transfers the transfer target objects 1, the system controller 130 may output error information to a picker controller (not shown) of the variable picker module 10 to stop the operation of the variable picker module 10 and notify an operator of the error information.

Here, when a mounting error of the picker mount 20 occurs, the system controller 130 alerts an operator through an alarm or a monitoring screen or transmits contents of the mounting error of the picker mount 20 to a mobile terminal of the operator through a messenger service, thereby allowing the operator to correct the error.

The system controller 130 may identify in advance a state in which a wrong type of the picker mount 20 is mounted on the picker 11 and may notify an operator of error information, thereby allowing the operator to correct an error. Accordingly, it is possible to prevent a problem in which the transfer target object 1 is damaged due to the use of an inappropriate picker mount 20 when the transfer target object 1 is transferred by the variable picker module 10.

Figure 6:
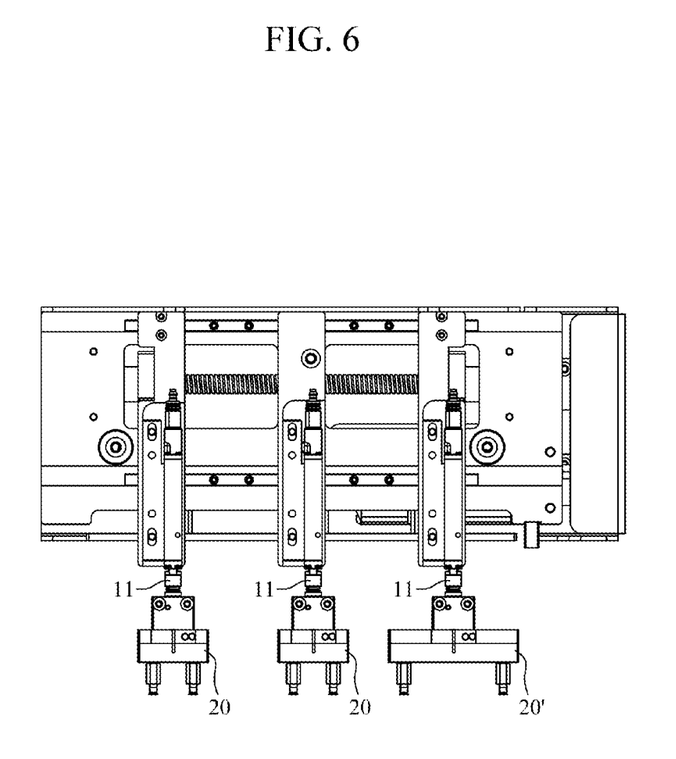
FIG. 6 is a view illustrating an example in which the picker mount is erroneously mounted.

In particular, as shown in FIG. 6, the system controller 130 may identify in advance a state in which a picker mount 20' used for transferring a relatively large transfer target object 1 is not replaced in time even though the transfer target object 1 is changed from a relatively large type to a relatively small type, thereby notifying an operator of error information to allow the operator to correct an error.

Therefore, it is possible to prevent a problem in which, since the interval between the pickers 11 is adjusted to be narrow in a state in which the picker mount 20 used for transferring the relatively large transfer target object 1 is not replaced in time, the picker mount 20 interferes with the picker mount 20 positioned in the vicinity to damage the picker 11.

Figure 7:
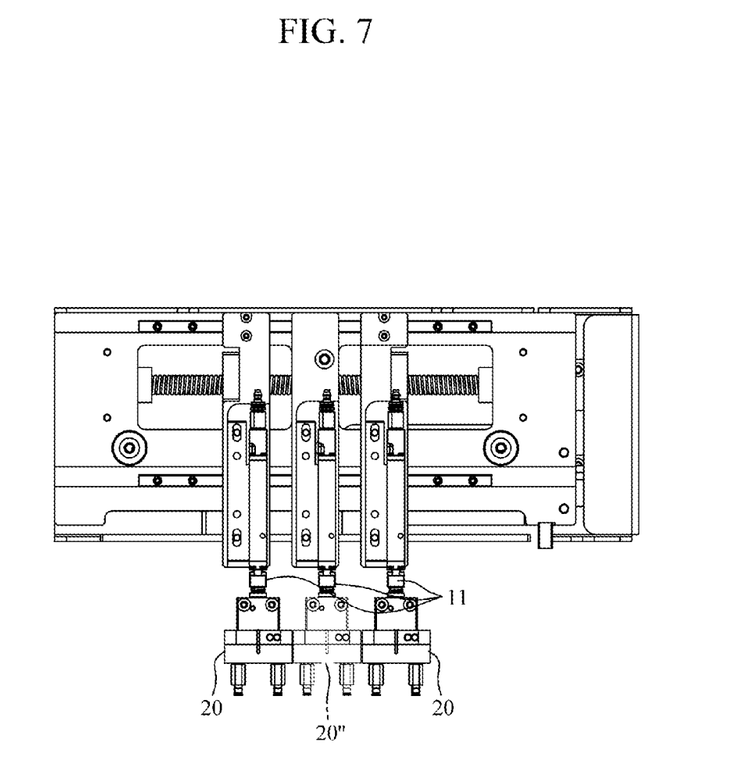
FIG. 7 is a view illustrating another example in which the picker mount is erroneously mounted.

In addition, as shown in FIG. 7, when the picker mounts 20 are intermittently mounted and arranged on the pickers 11 according to a type of the transfer target object 1, for example, when the picker mounts 20 are mounted and arranged on every other pickers 11, the system controller 130 may identify whether a picker mount 20", which should not be present, is mounted. As described above, the system controller 130 may identify in advance whether there is an error in an arrangement state of the picker mount 20 to notify an operator of error information, thereby allowing the operator to correct the error.

Figure 8:
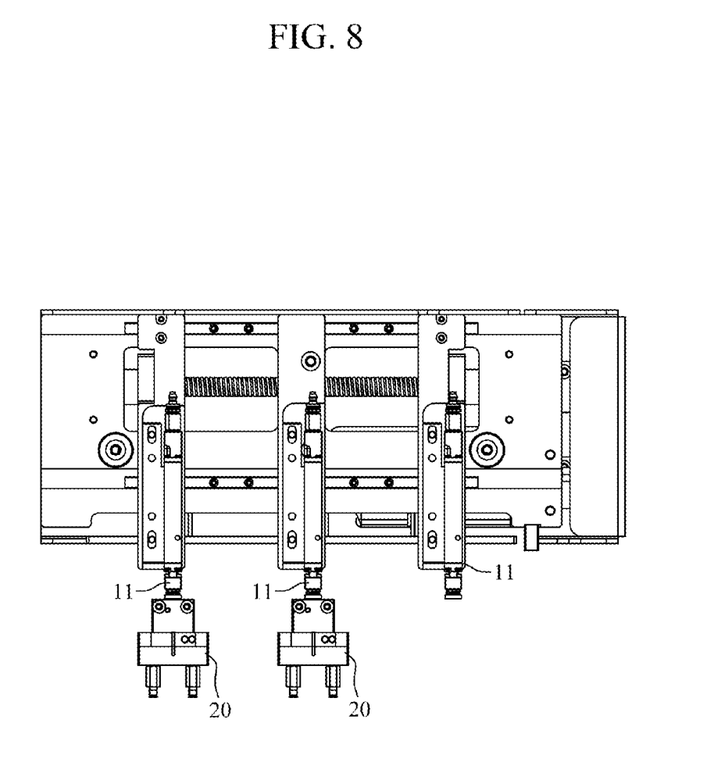
FIG. 8 is a view illustrating an example in which the picker mount is not mounted.

As shown in FIG. 8, the system controller 130 may identify in advance a state in which there is no picker mount 20 to be mounted on the corresponding picker 11 and may notify an operator of error information, thereby allowing the operator to correct an error. Therefore, it is possible to prevent a problem in which, when the variable picker module 10 transfers the transfer target object 1, an error in transferring the transfer target object 1 between the trays 2 occurs because the picker mount 20 to be mounted on the corresponding picker 11 is not mounted.

As described above, according to the system 100 for confirming a mounted state of picker mounts according to the present embodiment, before an operation in which the variable picker module 10 transfers the transfer target object 1, whether the picker mounts 20 are properly mounted on the pickers 11 is identified in advance, and then the variable picker module 10 is operated for a transfer operation, thereby preventing damage to the transfer target object 1, damage to the picker, or a transfer error.

A mounted state of the picker mounts according to one embodiment of the present invention is identified as follows.

First, the barcodes 110 including information for identifying types of the picker mounts 20 are formed and provided on the corresponding picker mounts 20. The picker mounts 20 are mounted or replaced for each type according to a type of the transfer target object 1 which is to be transferred between the trays 2.

In this state, before an operation in which the variable picker module 10 transfers the transfer target object 1, while the picker mounts 20 mounted on the pickers 11 are moved in the arrangement direction of the pickers 11, the barcode 110 of the picker mounts 20 are sequentially read by the barcode reader 120.

Then, the system controller 130 identifies positions and types of the corresponding picker mounts 20 based on information provided from the barcode reader 120 and then compares the identified positions and types with a validation criteria to identify whether the picker mounts 20 are erroneously mounted and are not mounted.

When the system controller 130 identifies that the picker mounts 20 are erroneously mounted or not mounted, the system controller 130 may output error information to the picker controller of the variable picker module 10 to stop the operation of the variable picker module 10 and notify an operator of the error information, thereby allowing the operator to appropriately correct an error.

Although the present invention has been described with reference to embodiments shown in the accompanying drawings, the embodiments are merely examples, and those skilled in the art will appreciate that various modifications and equivalent other embodiments are possible therefrom. Therefore, the true technical protection scope of the present invention should be determined only by the appended claims.

The invention claimed is:

1. A system for confirming a mounted state of picker mounts, which identifies a mounted state of picker mounts provided for each type according to sizes of types of transfer target objects and mounted on pickers of a variable picker module, the system comprising:

barcodes which include information for identifying types of the picker mounts and are formed on the picker mounts, wherein each picker mount comprises a mount body having at least one nozzle for handling the transfer target objects and a coupling portion for detachably connecting the mount body to a pneumatic actuating end of a picker;

a barcode reader which is disposed around the variable picker module to sequentially read the barcodes of the picker mounts moving in an arrangement direction of the pickers in a state of being mounted on the pickers; and a system controller which identifies positions and types of the picker mounts based on information provided from the barcode reader and then compares the identified positions and types with a validation criteria to identify whether the picker mounts are erroneously mounted or are not mounted, wherein the variable picker module includes an interval adjustment mechanism for adjusting spacing between the pickers according to the sizes of the transfer target objects; and wherein, when the system controller identifies any picker mount as erroneously mounted or not mounted, the system controller outputs an error signal to stop operation of the variable picker module and alert an operator.

2. The system of claim 1, wherein the barcode is a two-dimensional barcode; and
wherein the barcode reader is configured to read the two-dimensional barcode.

3. A method of confirming a mounted state of picker mounts, which identifies a mounted state of picker mounts provided for each type according to sizes of types of transfer target objects and mounted on pickers of a variable picker module, the method comprising:

forming and providing barcodes, which include information for identifying types of the picker mounts, on the picker mounts each of which includes at least one nozzle and a mount body forming a fluid path for pneumatic pressure to the nozzle;

moving the picker mounts mounted on the pickers in an arrangement direction of the pickers and sequentially reading, by a barcode reader, the barcodes of the picker mounts;

identifying positions and types of the picker mounts based on information provided from the barcode reader and then comparing the identified positions and types with a validation criteria to identify whether the picker mounts are erroneously mounted or are not mounted; and outputting an error signal to stop operation of the picker module and alert an operator when any picker mount is identified as erroneously mounted or not mounted.

* * * * *